United States Patent Office 2,937,146
Patented May 17, 1960

2,937,146

ANTIFREEZE COMPOSITION

Claude Ross Cutlip, Wilmington, Del., and Richard David Scheer, Kennett Square, Pa., assignors to E. I. du Pont de Nemours and Company, Wilmington, Del., a corporation of Delaware No Drawing. Application November 21, 1956
Serial No. 623,537

3 Claims. (Cl. 252—75)

This invention relates to antifreeze compositions suitable for use as coolants in internal combustion engines and relates more specifically to such compositions that become corrosive after extended use and to means for distinguishing their inversion from the non-corrosive to the corrosive state. This application is a continuation-in-part of S.N. 554,621, filed December 22, 1955.

The ethylene glycol and similar polyhydric alcohol antifreeze solutions on the market today meet practically all the requirements of a permanent coolant for internal combustion engines except for the necessary protection of metal surfaces in contact with the coolant over a period longer than one winter. This limitation in metal protection compels the manufacturers of glycol antifreeze solutions to recommend to their customer-users that the solutions must, for safety reasons, be drained out of the cooling systems after each season's use. Insofar as the antifreeze characteristics are concerned, the solutions retain substantially all of their initial effectiveness; potential corrosive tendencies, however, exist and make continued use inadvisable.

For many years it has been known that sodium tetraborate is outstandingly effective as a corrosion inhibitor in alcoholic antifreeze compositions (Kepfer U.S. 1,911,195, issued May 30, 1933). Many attempts have been made to provide improved antifreeze solutions containing inhibitors other than sodium tetraborate. Despite these numerous attempts, much of the antifreeze manufactured in this country at the present time contains the sodium tetraborate corrosion inhibitor.

It has been discovered in recent years, however, that an improved corrosion inhibiting action can be obtained by using paired inhibitors, e.g., by pairing sodium tetraborate with mercaptobenzothiazole (Keller U.S. 2,373,570, April 10, 1945), or by employing an alkali metal tetraborate in combination with an alkali metal phosphate (Canadian Patent 438,016, issued to Duus, November 19, 1946; Kiffer U.S. 2,384,553, issued September 11, 1945). The discovery of the synergistic action of the sodium tetraborate-mercaptobenzothiazole inhibitor has made possible the manufacture of antifreeze compositions which remain non-corrosive for more extensive periods of time. The pairing of an alkali metal tetraborate with an alkali metal phosphate also has given rise to antifreeze compositions superior to those obtainable by the use of individual inhibitors.

The above described corrosion inhibited glycol-type antifreeze solutions, while virtually unsurpassed from the standpoint of anti-corrosion properties, have certain disadvantages which are also present in other corrosion-inhibited glycol-type antifreezes to an even greater extent. For example, under some conditions of use they eventually lose their initially excellent non-corrosive property.

An object of the present invention is to provide further improvements in glycol-type antifreeze solutions. A further object is to provide a non-corrosive antifreeze solution in which the inversion from an initial non-corrosive to a corrosive state can be detected by any and everyone of the millions of automotive car users. Yet another object is to provide an ethylene glycol antifreeze which is superior to previously known antifreeze solutions. Other objects and advantages of the invention will hereinafter appear.

Research studies extending over a period of years have revealed that glycol-type corrosion inhibited antifreeze solutions taken from cars after one season's use have iron corrosion rates which are dependent on the amount of reserve alkalinity as shown below:

| Solutions Taken From Cars | Iron Corrosion Rate Per Thousandths of an Inch Per Year |
|---|---|
| None of the reserve alkalinity lost (basic solution) | 9 |
| Half of the reserve alkalinity lost (basic solution) | 30 |
| Three quarters of the reserve alkalinity lost | 100 |
| All of the reserve alkalinity lost (acidic solution) | 600 |

These studies and others support the conclusion that a solution that has lost no more than half of its initial reserve alkalinity during the first year of use, may safely be used for a second winter season, while those with a greater loss should be drained to avoid undue corrosion.

While these results can be arrived at by carefully controlled studies of car operation supported by laboratory analysis of antifreeze solutions, facilities for analyzing spent or partially spent antifreeze solutions are not available to the car user or to the garage mechanic who needs a quick and easy method for checking the used antifreeze for corrosive properties. Consequently, such solutions have been and are ordinarily discarded, willy nilly, in the interest of safety, after a single year's use.

The invention is directed to the preparation of glycol-type antifreeze solutions that the ordinary user of an automobile, the mechanic, and others unskilled in research and in chemistry, can examine and determine, to his own satisfaction, whether or not the used antifreeze should be retained or replaced. The problem of developing such a solution was a difficult one. The problem has been before the industry for a number of years with no satisfactory answer, for obviously the general public neither has available for use the facilities of a research laboratory nor training to use such facilities, were they available. The solution to the problem must provide some extremely simple means of recognizing the inversion of the antifreeze solution.

The composition of the present invention potentially provides the solution to the problem. Said composition comprises a polyhydric alcohol, in concentrated form, with a corrosion inhibitor and a stable dye, or indicator, that changes color when the solution inverts from the non-corrosive to the corrosive state. With such a solution in his car radiator, the ordinary car owner for the first time is able, by simple observation of the color of the solution, to determine its utility and whether or not it should be discarded.

The alcoholic antifreeze compositions which are employed in the practice of the invention contain water-soluble polyhydric alcohols, e.g., ethylene glycol, propylene glycols, butylene glycols, glycerol, 1,3-butylene glycol, etc., or mixtures thereof, as freezing point depressants. The preferred undiluted composition of the invention contains from 90 o 96% by weight of the polyhydric alcohol or alcohols. These solutions contain corrosion inhibitors that chemically react with corrosion-producing acids formed during use of the antifreeze.

Any suitable type of a chemical corrosion inhibitor with or without a buffer may be used. While such bases as the alkali metal and alkaline earth metal hydroxide, carbonates, and bicarbonates are often satisfactory, the preferred inhibitors are the alkali metal borates. The quantity of alkali metal meta borate employed as corrosion inhibitor may be 0.5 to 7.5% of the weight of the alcohol. The alkali metal meta borate may be added to the ethylene glycol directly or formed in situ by adding an alkali metal borate together with an alkali metal hydroxide to the solution. Organic inhibitors, such as mercaptobenzothiazole compounds (e.g. mercaptobenzothiazole, alkali metal mercaptobenzothiazoles, etc.), diisopropyl amine nitrite, mono-, di- and tri-ethanol amine and salts thereof, etc. may be used in combination with the alkali metal meta borate inhibitor, if desired. The weight of organic inhibitor, when one is used, should be from 0.0001 to 0.5%, based on the weight of alcohol. These organic inhibitors may be omitted altogether, if desired, or they may be used in extremely small quantities.

The indicators used in the antifreeze solution are limited to those that (1) have one distinctive color in the non-corrosive solution and another distinctive color in the corrosive solution; (2) have the color change in the proper pH range to give optimum protection, i.e., between about 8.5 and 6.5; and (3) are not decomposed during normal use by the drastic changes of temperature and other conditions extant in the car radiator.

Examples of indicators that conform with the above specifications and give color changes in dihydric alcohol solutions, as the pH of that solution changes from about 8.5 to about 6.0, include: the azine dye, toluylene red (neutral red); the anthroquinone dye, alizarine red; the triphenylmethane dye, rosolic acid (Aurin); the xanthene dyes: cresol red (o-cresolsulfonephthalein), chlorophenol red (dichlorophenolsulfonephthalein), and phenol red (phenolsulfonephthalein); the monoazo dyes: methyl orange and methyl red; the diazo dyes: Congo red and brilliant yellow; the oxazine dyes: lacmoid and lacmosol; and the nitro dyes: M-nitrophenol, p-nitrophenol, 6,8-dinitro-2,4-(1H,3H) - quinazolinedione (dinitrobenzoyleneurea). Mixtures of dyes may likewise be used such as 50% neutral red and 50% methylene blue by weight; bromothymol blue (3,3-dibromothymolsulfonephthalein) and phenol red; neutral red and methyl violet; chlorophenol red and bromothymol blue; and 6,8-dinitro 2,4-(1H,3H) - quinazolinedione and anthraquinone violet (non-indicator). A universal indicator may be used such as one containing methyl red, phenolphthalein, and bromothymol blue, as well as other dye mixtures of two or more dyes that give a dye having a distinctive color in the non-corrosive antifreeze solution and a different distinctive color in the corrosive solution within the above pH range. As has been noted, mixtures of dyes may be used. By this means a dye not within the desired pH range, such as methyl violet, can, by the addition of a complementary dye, neutral red, give, with the latter, a change within the desired range. The dye or mixture of dyes is used to the extent of from 0.01 to 0.5 gram/liter of the antifreeze solution.

In the examples of the anti-corrosion antifreeze solutions of the invention given below, the percent is by weight unless otherwise stated.

*Example I.*—An anti-corrosive antifreeze solution is prepared having this composition:

| | |
|---|---|
| Ethylene glycol _____percent__ | 94.30 |
| Borax _____do____ | 1.33 |
| Sodium hydroxide _____do____ | .27 |
| Water _____do____ | 4.10 |
| Phenolsulfonephthalein _____g./liter__ | 0.1 |

As prepared, the solution has a pH of about 7.5 and has a red color. The solution when diluted to 50% with water, the concentration usually employed in an automobile radiator to give the desired cold weather protection, has a pH of about 9.0 and a somewhat deeper red coloration. A solution containing the listed ingredients was used as an anti-corrosion antifreeze in a number of automobile radiators and retained the initial red color for more than 65,000 test miles. In those radiators in which corrosion developed due to excessive oxidation or other causes, and the pH dropped below about 6.8, the solution had less than three-quarters of its reserve alkalinity and the color changed from the initial deep red to a distinct yellow.

*Example II.*—An anti-corrosive antifreeze solution is prepared having this composition:

| | |
|---|---|
| Ethylene glycol _____percent__ | 95.00 |
| Sodium meta borate _____do____ | 2.75 |
| Water _____do____ | 2.25 |
| Phenolsulfonephthalein _____g./liter__ | 0.15 |

This anti-corrosion antifreeze solution, as descrbed, and when diluted with water for use in an automobile cooling system, has a distinctive red color which changes to a distinctive yellow color when the reserve alkalinity has been used up by oxidation of the ethylene glycol to acidic substances or by other conditions in the cooling systems that destroy the buffering action of the sodium meta borate used.

*Example III.*—An anti-corrosive antifreeze solution is prepared having this composition:

| | |
|---|---|
| Ethylene glycol _____percent__ | 84.20 |
| Propylene glycol _____do____ | 9.00 |
| Borax _____do____ | 5.32 |
| Sodium hydroxide _____do____ | 1.06 |
| Mercaptobenzothazole _____do____ | .01 |
| Water _____do____ | .41 |
| Phenolsulfonephthalein _____g./liter__ | 0.1 |

This antifreeze solution has ample reserve alkalinity to protect automobile cooling systems from corrosion and, if through oxidation or other cause, develops acidity, such that reserve falls below an amount that reduces the pH of the solution below about 6.8, the color of the solution will change from a red to a yellow.

*Example IV.*—An anti-corrosive antifreeze solution is prepared having this composition:

| | |
|---|---|
| Ethylene glycol _____percent__ | 94.30 |
| Borax _____do____ | 1.33 |
| Sodium hydroxide _____do____ | .27 |
| Water _____do____ | 4.10 |
| Rosolic acid _____g./liter__ | 0.1 |

As prepared, the solution has a pH of about 7.5 and has a red color. The solution when diluted to 50% with water, the concentration usually employed in an automobile radiator to give the desired cold weather protection, has a pH of about 9.0 and when the pH changes to about 6.0, the color changes to a yellow.

*Example V.*—The antifreeze solution of Example IV, except that cresol red is used as the dye and the color changes from a violet red in the non-corrosive to a yellow in the corrosive antifreeze.

*Example VI.*—An anti-corrosive antifreeze solution is prepared having this composition:

| | |
|---|---|
| Ethylene glycol _____percent__ | 84.20 |
| Propylene glycol _____do____ | 9.00 |
| Borax _____do____ | 5.32 |
| Sodium hydroxide _____do____ | 1.06 |
| Mercaptobenzothiazole _____do____ | .01 |
| Water _____do____ | .41 |
| Neutral red 50%_____g./liter__ | 0.1 |
| Methylene blue 50%_____g./liter__ | 0.1 |

This antifreeze solution has ample reserve alkalinity to protect automobile cooling systems from corrosion and, if through oxidation or other cause, the solution develops acidity, such that reserve falls below an amount that reduces the pH of the solution below about 6.8, the color of the solution will change from a green to violet blue.

The term "antifreeze solution" as employed in the specification and claims includes the diluted antifreeze

We claim:

1. In a colored antifreeze solution containing a polyhydric alcohol of the group consisting of glycols and glycerol as the major constituent and a reserve alkalinity from a corrosion inhibitor containing an alkali metal meta borate, which solution is corrosive to iron at a rate of no more than 0.1 inch per year, during use and over a period in which the reserve alkalinity changes from full reserve alkalinity to one-quarter reserve alkalinity, a color indicator comprising a pH sensitive dye that changes the color of the antifreeze solution when the reserve alkalinity falls to one quarter of the original reserve alkalinity.

2. The antifreeze solution of claim 1 in which the dye changes the color of the solution as the reserve alkalinity decreases and the pH falls from 8.5 to 6.5.

3. The antifreeze solution of claim 2 in which the polyhydric alcohol is ethylene glycol and the reserve alkalinity is obtained from 0.1 to 7.5% by weight of sodium meta borate.

References Cited in the file of this patent

UNITED STATES PATENTS

| | | |
|---|---|---|
| 1,915,965 | Williams | June 27, 1933 |
| 2,054,282 | Clarkson et al. | Sept. 15, 1936 |
| 2,225,866 | Holtzclaw | Dec. 24, 1940 |
| 2,249,867 | Snelling | July 22, 1941 |
| 2,373,570 | Keller | Apr. 10, 1945 |